US012681782B2

(12) United States Patent
Chen

(10) Patent No.: US 12,681,782 B2
(45) Date of Patent: Jul. 14, 2026

(54) EVENT CLASSIFICATION USING SYNTHETIC DATA SETS

(71) Applicant: SAP SE, Walldorf (DE)

(72) Inventor: Yangyang Chen, Zigong (CN)

(73) Assignee: SAP SE, Walldorf (DE)

( * ) Notice: Subject to any disclaimer, the term of this patent is extended or adjusted under 35 U.S.C. 154(b) by 551 days.

(21) Appl. No.: 18/310,899

(22) Filed: May 2, 2023

(65) Prior Publication Data

US 2024/0370317 A1 Nov. 7, 2024

(51) Int. Cl.
G06F 9/54 (2006.01)
G06F 18/2415 (2023.01)

(52) U.S. Cl.
CPC .......... G06F 9/542 (2013.01); G06F 18/2415 (2023.01)

(58) Field of Classification Search
CPC .............................. G06F 9/542; G06F 18/2415
See application file for complete search history.

(56) References Cited

U.S. PATENT DOCUMENTS

| | | | | |
|---|---|---|---|---|
| 2016/0360008 | A1* | 12/2016 | Brown | G06F 9/461 |
| 2020/0387866 | A1* | 12/2020 | Francis | G06T 7/292 |
| 2021/0271934 | A1* | 9/2021 | White | G06N 3/082 |
| 2021/0397903 | A1* | 12/2021 | Raj | H04L 67/535 |
| 2024/0256870 | A1* | 8/2024 | Samples | G06F 18/24 |
| 2025/0217703 | A1* | 7/2025 | Chakravorty | G06N 20/00 |

OTHER PUBLICATIONS

Crew, Oleary "Cloud Native Computing Foundation ("CNCF") Charter", The Linux Foundation, Effective Nov. 6, 2015 / Updated Jul. 28, 2021, downloaded from URL:https://github.com/cncf/foundation/blob/main/charter.md., [retrieved on Apr. 28, 2023], 16pgs.
"Kubernets, also known as K8s", downloaded from URL:https://kubernetes.io/, [retrieved on Apr. 28, 2023], 6pgs.
PROMETHEUS "Getting Started", downloaded from URL:https://prometheus.io/docs/prometheus/latest/getting_started/), [retrieved on Apr. 28, 2023], 8pgs.

(Continued)

*Primary Examiner* — Peng Ke
(74) *Attorney, Agent, or Firm* — Buckley, Maschoff & Talwalkar LLC

(57) ABSTRACT

Systems and methods include determination of a plurality of event types, determination of a plurality of associated metrics for each of the plurality of event types, generation of synthetic time-series data of each of the metrics associated with the event types for each of the plurality of event type, the synthetic time-series data representing metric anomalies and events of the event type, training of a first system to generate anomaly values based on the synthetic time-series data, training of a second system to classify event types based on the anomaly values, determination of an anomaly value for each data instance of actual time-series data, determination of event types for each determined value, selection of data instances based on the determined values and event types, reception of an event type for each selected data instance, and re-training of the second system based on the selected data instances and event types.

20 Claims, 8 Drawing Sheets

(56)     References Cited

OTHER PUBLICATIONS

Mart, Octavian et al., "Observability in Kubernetes Cluster: Automatic Anomalies Detection using Prometheus", 2020 IEEE 22nd International Conference on High Performance Computing and Communications; IEEE 18th International Conference on Smart City; IEEE 6th International Conference on Data Science and Systems (HPCC/SmartCity/DSS), DOI:10.1109/HPCC-SmartCity-DSS50907.2020.00071, (pp. 565-570, 6 total pages).

Zhao, Yue et al., "XGBOD: Improving Supervised Outlier Detection with Unsupervised Representation Learning," 2018 International Joint Conference on Neural Networks (IJCNN), 2018, doi: 10.1109/IJCNN.2018.8489605, (pp. 1-8, 8 total pages).

Wang, Yao et al., "Practical and White-Box Anomaly Detection through Unsupervised and Active Learning," 2020 29th International Conference on Computer Communications and Networks (ICCCN), 2020, doi: 10.1109/ICCCN49398.2020.9209704, (pp. 1-9, 9 total pages).

Carmona, Chris U. et al., "Neural contextual anomaly detection for time series", arXiv preprint arXiv:2107.07702, [cs.LG.], Jul. 16, 2021, 22pgs.

Zhao, Nengwen et al., "Label-Less: A Semi-Automatic Labelling Tool for KPI Anomalies," IEEE Infocom 2019—IEEE Conference on Computer Communications, 2019, doi: 10.1109/INFOCOM.2019.8737429, (pp. 1882-1890, 9 total pages).

Pimental, Tiago et al., "Deep Active Learning for Anomaly Detection," 2020 International Joint Conference on Neural Networks (IJCNN), 2020, doi: 10.1109/IJCNN48605.2020.9206769, (pp. 1-8, 8 total pages).

Wang, Chengyu et al., "TSAGen: Synthetic Time Series Generation for KPI Anomaly Detection," in IEEE Transactions on Network and Service Management, vol. 19, No. 1, Mar. 2022, doi: 10.1109/TNSM.2021.3098784, (pp. 130-145, 16 total pages).

The Prometheus Node Explorter, "Monitoring Linux Host Metrics With the Node Exporter", downloaded from URL:https://prometheus.io/docs/guides/node-exporter/#node-exporter-metrics, [retrieved on Apr. 28, 2023), 4pgs.

* cited by examiner

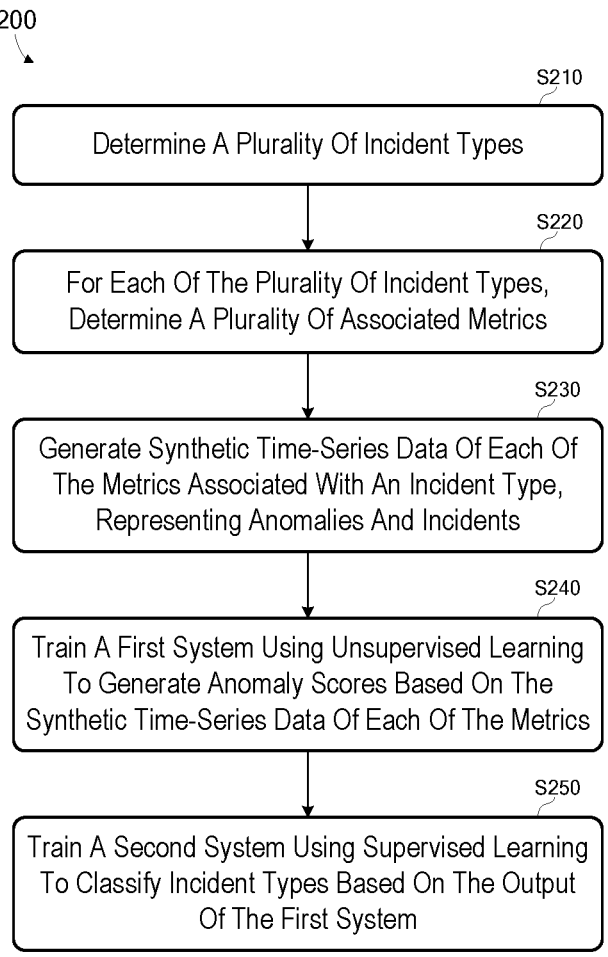

200

S210

Determine A Plurality Of Incident Types

S220

For Each Of The Plurality Of Incident Types, Determine A Plurality Of Associated Metrics

S230

Generate Synthetic Time-Series Data Of Each Of The Metrics Associated With An Incident Type, Representing Anomalies And Incidents

S240

Train A First System Using Unsupervised Learning To Generate Anomaly Scores Based On The Synthetic Time-Series Data Of Each Of The Metrics

S250

Train A Second System Using Supervised Learning To Classify Incident Types Based On The Output Of The First System

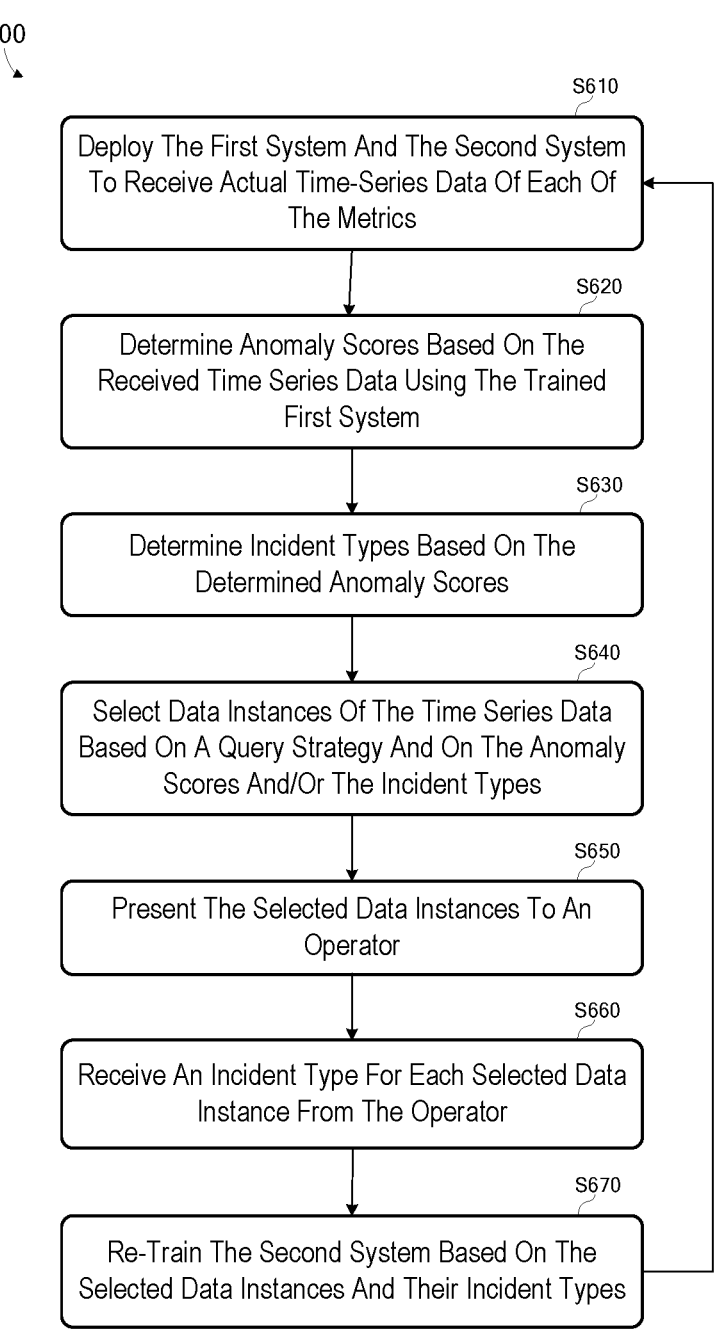

S610

Deploy The First System And The Second System To Receive Actual Time-Series Data Of Each Of The Metrics

S620

Determine Anomaly Scores Based On The Received Time Series Data Using The Trained First System

S630

Determine Incident Types Based On The Determined Anomaly Scores

S640

Select Data Instances Of The Time Series Data Based On A Query Strategy And On The Anomaly Scores And/Or The Incident Types

S650

Present The Selected Data Instances To An Operator

S660

Receive An Incident Type For Each Selected Data Instance From The Operator

S670

Re-Train The Second System Based On The Selected Data Instances And Their Incident Types

*FIG. 6*

EVENT CLASSIFICATION USING SYNTHETIC DATA SETS

BACKGROUND

Modern organizations often utilize a system landscape consisting of distributed computing systems providing various computing services. For example, in order to implement desired functionality, an organization may deploy services within on-premise data centers (which themselves may be located in disparate geographic locations) and within data centers provided by one or more infrastructure as-a-service (IaaS) providers. A system landscape may also include computing systems operated by third parties, which are accessed using region-specific access points defined by the third parties. Any number of the computing systems may comprise cloud-based systems (e.g., providing services using scalable-on-demand virtual machines).

Purveyors of distributed systems are rapidly adopting cloud-native implementations using containers, microservices, service meshes, and serverless applications, which provide features such as built-in service discovery and load balancing, automated rollouts and rollbacks, and self-healing. These approaches abstract network and hardware problems from product development teams, which frees the teams to invest more resources in product development.

Anomalies are rare items, events or observations that differ significantly from normal system states. Anomalous behavior of technical components (e.g., network adapters, containers) within a system landscape contributes negatively to the overall operational cost of the landscape. It is therefore desirable to efficiently detect and classify anomalies which occur within a system landscape. As microservice environments become increasingly dynamic and scale to hundreds of thousands of hosts, it becomes exponentially difficult detect anomalies in time to prevent business-impacting issues from proliferating.

Moreover, technical anomalies do not always correspond to events, i.e., actual incidents of concern. An anomaly in a single technical metric is often insufficient to determine whether or not an incident has occurred or is occurring. For example, a high value of current CPU usage on a server may or may not indicate an incident. If the values of other metrics of the server are anomalous, then the likelihood of an incident may be greater.

It is therefore desirable to use the values of multiple metrics to detect anomalies and to determine whether actual incidents of concern have occurred. In theory, a classifier may be trained to perform this classification task. However, due to the complexity of this task, a vast amount of labeled data is required to achieve the desired precision and recall of the classifier. Labeling large data sets is expensive and requires expert knowledge. With the help of a purpose-designed user-friendly labeling tool, an experienced engineer requires several hours to label six months' worth of data including 300,000 data points spaced at one-minute intervals. Expending such resources on labeling is not acceptable in most organizations. Moreover, since events are quite rare, acquisition of sufficient amounts of labeled data may be practically impossible.

Due to the labeling problems described above, approaches for implementing these classification tasks typically use unsupervised learning techniques. These approaches include the use of recurrent artificial neural networks (RNNs) such as Long Short-Term Memory networks. Such networks predict future samples of a "normal" time series, and the distance between actual values and the predicted samples can be interpreted as a score indicating the extent of anomalous behavior. Other classification approaches such as Nearest Neighbors or Local Outlier Factor determine density measures which may assist in the identification of outliers (i.e., abnormal states) of a system. Local Outlier Probability provides an anomaly score in the range of [0, 1], which can be interpreted as the probability of an instance of a data set being "anomalous" to a given level of confidence.

Unsupervised learning systems are typically less useful and accurate than supervised learning systems. Systems are desired to provide the benefits of supervised learning systems while addressing some of the above-noted labeling issues.

BRIEF DESCRIPTION OF THE DRAWINGS

FIG. 2 is a flow diagram of a process to train an unsupervised learning system using synthetic data and to train a supervised learning system using labeled data instances and according to some embodiments.

FIG. 6 is a flow diagram of a process to label selected data instances during deployment of a trained unsupervised learning system and a trained supervised learning system according to some embodiments.

DETAILED DESCRIPTION

The following description is provided to enable any person in the art to make and use the described embodiments. Various modifications, however, will remain readily-apparent to those in the art.

Some embodiments include generation of synthetic time-series data of multiple metrics which reflects anomalies and events, which will also be referred to herein as incidents. This data is used to generate training data instances for training a classification model. The trained classification model is deployed in a production environment to detect and classify incidents based on data instances originating from the production environment. Particular ones of the data instances are selected based on predefined criteria and presented to an operator, who confirms and, if necessary, corrects the labeling thereof by the classification model. These operator-labeled data instances are then used to retrain and improve the classification model.

Embodiments may therefore balance labeling effort against incident detection and classification performance.

The use of synthetic data to train and initialize the classification model advantageously allows for some level of incident detection until a sufficient amount of operator-labeled data is available. Embodiments also advantageously allow the use of different query strategies to select informative and representative data instances to present to an operator for labeling.

Figure 1:
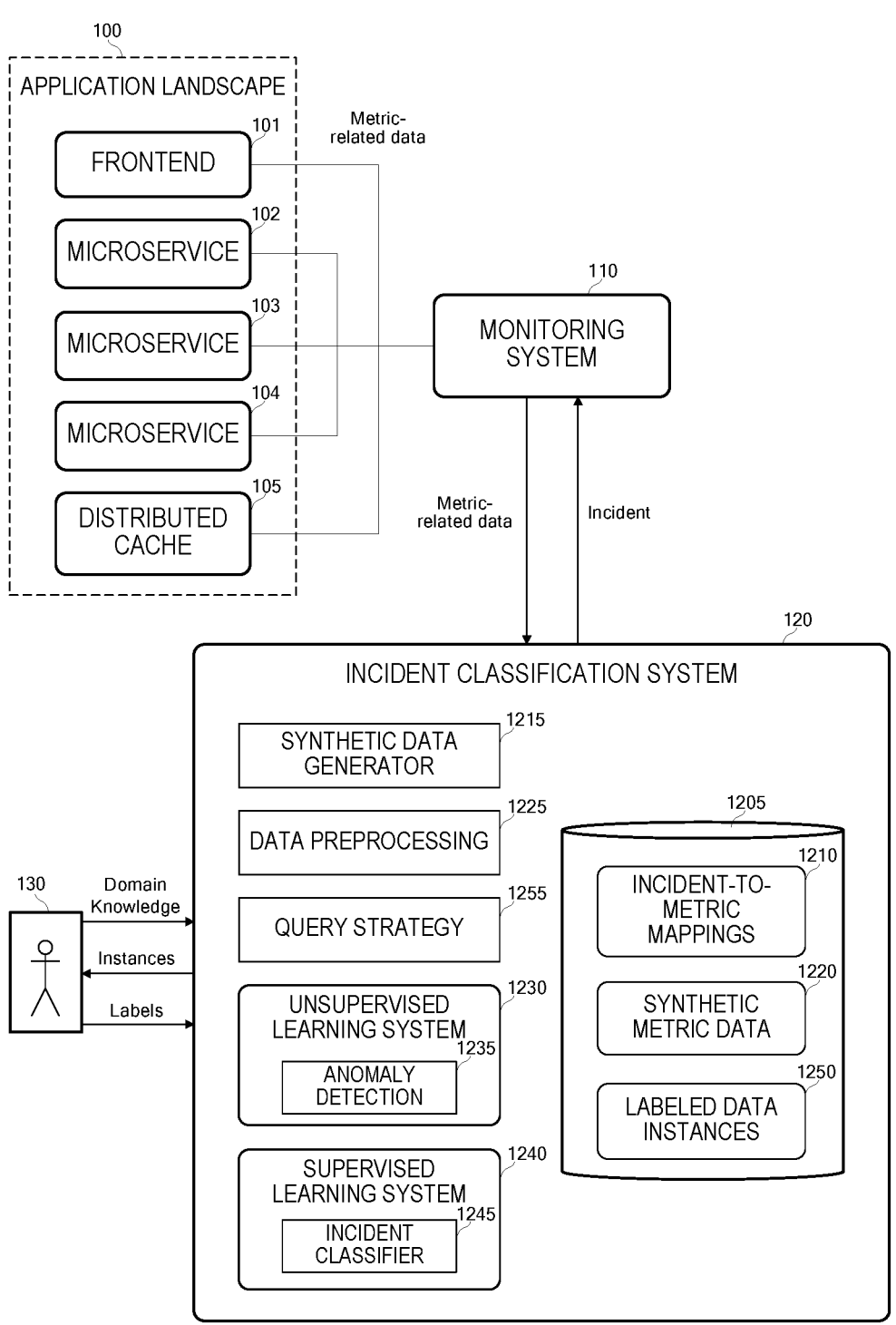
FIG. 1 illustrates a system to detect incidents using synthetic data, unsupervised learning and labeled data instances and according to some embodiments.

FIG. 1 illustrates a system according to some embodiments. The illustrated components of FIG. 1 may be implemented using any suitable combinations of computing hardware and/or software that are or become known. Such combinations may include cloud-based implementations in which computing resources are virtualized and allocated elastically. In some embodiments, two or more components are implemented by a single computing device.

Application landscape 100 may comprise any number of hardware and software components which may provide functionality to one or more users (not shown). In the present example, application landscape 100 may provide an application (e.g., an online store) and includes front end (i.e., user interface) component 101, microservices 102-104 (e.g., catalog service, payment service, recommendation service, etc.) and distributed cache 105 for use by each of microservices 102-104. Embodiments are not limited to a single application or to the components of application landscape 100. Application landscape 100 may comprise disparate cloud-based services, a single computer server, a cluster of servers, and any other combination that is or becomes known.

The hardware and software components of application landscape 100 generate data as is known in the art. Such data may be related to metrics associated with resource consumption (e.g., CPU utilization, memory utilization, bandwidth consumption), hardware performance (e.g., read/write speeds, bandwidth, CPU speed), application performance (e.g., queries served per second, number of simultaneous sessions), business performance (e.g., number of completed transactions, number of overseas orders), and any other metrics that are or become known. The data generated for each metric may comprise time-series data and may be generated at different respective time intervals.

Monitoring system 110 may comprise any suitable system to receive the metric-related data generated by application landscape 100. Monitoring system 110 may query application landscape 100 for selected metric-related data, may subscribe to the selected metric-related data, may receive metric-related data pushed from application landscape 100, or may acquire the metric-related therefrom using any suitable protocol. Monitoring system 110 may execute an application for recording real-time metric data in a time-series database using an HTTP pull model.

Monitoring system 110 provides time-series data of each of a plurality of metrics received from application landscape 100 to incident classification system 120 after system 120 is pre-trained as described below. Monitoring system 110 may provide the data for each metric (e.g., metrics $M_0$ to $M_9$) to incident classification system 120 as an independent time-series (e.g., $M_0t_0$, $M_0t_1$, . . . , $M_0t_n$; $M_1t_0$, $M_1t_1$, . . . , $M_1t_n$; . . . $M_9t_0$, $M_9t_1$, . . . , $M_9t_n$). In cases where the data is generated by application landscape 100 at high sampling rates, and in order to reduce processing costs, monitoring system 110 may provide time-series data based on a reasonable time delta $\Delta t$ (e.g., $M_0t_0$, $M_0(t_0+1*\Delta t)$, $M_0(t_0+2*\Delta t)$, . . . , $M_0(t_0+n*\Delta t)$) if a higher sampling rate is not required for incident classification. Embodiments are not limited thereto.

Application landscape 100 may comprise a microservice-based cloud-native system utilizing a Kubernetes cluster. Kubernetes is an open-source system for automating deployment, scaling and management of containerized applications. Monitoring system 110 may therefore comprise Prometheus, a Kubernetes-compatible monitoring system which collects metrics for every service in the cluster and supports monitoring, processing and alerting applications.

Monitoring system 110 may perform any suitable processing on the data prior to providing the data to incident classification system 120, including but not limited to noise reduction, normalization, and filtering. For example, monitoring system 110 may convert the time-series data into data instances, where each data instance includes values of each metric at a given time point (e.g., $[M_0t_0, M_1t_0, . . . , M_9t_0]$; $[M_0t_1, M_1t_1, . . . , M_9t_1]$). In other examples, the time-series data may be normalized in order to avoid artifacts due to the different scales of different metrics M. Pre-processing may also or alternatively be performed by system 120. Conversely, the processes attributed herein to incident classification system 120 may be performed in whole or in part by monitoring system 110 according to some embodiments.

Incident classification system 120 operates as described herein to detect and classify incidents based on time-series data of a plurality of metrics generated by application landscape 100. These metrics are determined based on domain knowledge received from operator 130. The domain knowledge may be based on experiences of operator 130 in determining whether an actual incident occurred based on metrics data. Specifically, the domain knowledge includes, for each of one or more incidents, a set of metrics which are believed to be relevant to the incident. One metric may be relevant to more than one incident. This domain knowledge may be stored in incident-to-metric mappings 1210 of storage 1205.

Incident classification system 120 includes synthetic data generator 1215 to generate synthetic time-series data 1220 of the metrics specified in mappings 1210. The synthetic time-series data is generated to include normal time-series data for each metric as well as anomalies for each metric. The anomalies include anomalies which indicate an incident and anomalies which do not indicate an incident. Data preprocessing component 1225 may subject synthetic data 1220 to any suitable preprocessing and/or feature engineering as is known in the art. The preprocessing may include creation of training data instances, where each training data instance represents values of all the metrics at a respective time point.

Unsupervised learning system 1230 trains anomaly detection system 1235 to generate anomaly-related values, or scores, based on training data instances of synthetic metric data 1220. Anomaly detection system 1235 may comprise a Recurrent Neural Network, a Kernel Density Estimation algorithm, a Nearest Neighbors algorithm, an Isolation Forest algorithm, a Local Outlier Factor algorithm or a Local Outlier Probability algorithm, for example. Unsupervised learning system 1230 may comprise any suitable system to train the selected type of anomaly detection system 1235.

Supervised learning system 1240 trains incident classifier 1245 to detect incidents and identify incident types. The initial training of incident classifier 1245 is based on labeled data instances 1250 of synthetic metric data 1220. As noted above, synthetic metric data 1220 is generated to include incidents and therefore the time periods associated with these incidents (as well as their incident types) are known. Accordingly, labeled data instances 1250 are training data instances of synthetic metric data 1220 which are labeled with incident types based on whether they are associated with time periods corresponding to particular incidents included in synthetic metric data 1220.

The trained anomaly detection system 1235 and incident classifier 1245 may then be deployed in a production environment. For example, incident classification system receives metric-related time-series data from monitoring system 110, which are preprocessed (e.g., including generation of time period-specific data instances based on the received metric-specific time-series data) and fed to trained anomaly detection system 1235. Incident classifier 1245 receives anomaly scores output by trained anomaly detection system 1235 and determines whether an incident has occurred and the incident type.

Moreover, query strategy component 1255 is executed to identify certain ones of the data instances. These identified data instances are presented to operator 130 (who may differ from operator(s) 130 from whom the domain knowledge was received), who confirms and, if necessary, corrects the labeling thereof. These operator-labeled data instances are stored in labeled data instances 1250. Also stored in labeled data instances 1250 may be the data instances which were not identified by query strategy component 1255 but were classified as incident-related by incident classifier 1245. Labeled data instances 1250 may therefore be used from time-to-time to retrain and improve incident classifier 1245.

FIG. 2 comprises a flow diagram of process 200 to train an unsupervised learning system using synthetic data and to train a supervised learning system using labeled data instances according to some embodiments. Process 200 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Initially, at S210, a plurality of incident types are determined. For example, using the Kubernetes framework, a node CPU incident type and a node disk incident type may be determined at S210. Next, for each of the plurality of incident types determined at S210, a plurality of metrics associated with the incident type are determined at S220. The metrics associated with an incident type are those metrics which, when taken together, are believed to be suited to indicate whether the incident type has occurred. The determined incident types and their associated metrics may be stored in incident-to-metrics mapping 1210.

Computing systems may generate hundreds of metrics, many of which may be irrelevant to detection of a particular type of type of incident. The Prometheus system may collect and store metrics for CPU usage and quota, for memory usage and quota, for network usage, for JVM threads, etc. By reducing these metrics to a subset of metrics which need to be processed for incident detection, S220 reduces subsequent memory consumption and computing cost.

S210 and S220 may include a discussion with one or more domain experts who are experienced with the types of incidents which are expected to be encountered (i.e., for the determination S210) and which metrics could be useful to detect each type of incident (i.e., for the determination at S220). Continuing the above example, the metrics determined at S220 for the node CPU incident type may include: the percentage of CPU time spent running user space processes; the percentage of CPU time spent in states other than Idle and IOWait; and the CPU load average over the past minute. The metrics determined at S220 for the node disk incident type may include: the average time for I/O requests issued to the device to be served; the average time for write requests issued to the device to be served; the average queue size of requests issued to the device; the amount of free RAM; and the number of write requests issued to the device per second.

Next, at S230, synthetic time-series data is generated for each of the metrics determined at S220. The synthetic time-series data is generated so as to include anomalies and incidents. The anomalies may include anomalous values of each metric. The anomalies may also include values of metrics associated with a given incident type at a given time point which are anomalous with respect to their "typical" values when taken together, although one or more of the values may not be anomalous with respect to its metric. The included incidents may comprise values, at a given time point, of a set of metrics associated with a given incident type that, when taken together, indicate an incident of the incident type. Such anomalies and incidents are included in the synthetic time-series data for each incident type.

Figure 3:
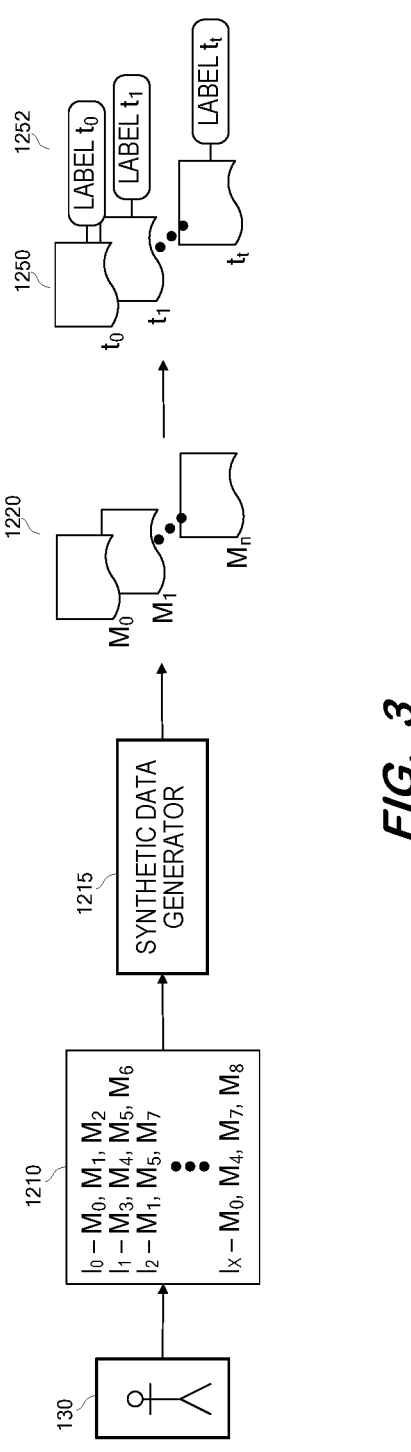
FIG. 3 illustrates labeling of data instances of synthetic data according to some embodiments.

A first system is trained at S240 using unsupervised learning to identify anomalies based on the synthetic time-series data of each of the metrics. Prior to such training, training data instances are generated from the synthetic time-series data. FIG. 3 illustrates generation of training data instances according to some embodiments.

As shown, input received from operator 130 is used to generate mapping 1210 including the incident types (i.e., $I_0$-$I_x$) and associated metrics determined at S210 and S220. Synthetic data generator 1215 generates synthetic time-series data 1220 at S230 for each of the metrics mentioned in mapping 1210. Next, time-series data 1220 is aggregated according to time period to generate training data instances 1250. For example, training data instance 1250 associated with time to includes the values of each determined metric at time to (i.e., $M_0t_0$, $M_1t_0$, $M_2t_0$, . . . , $M_nt_0$).

Figure 4:
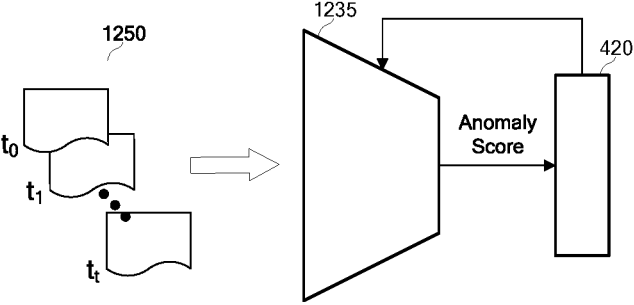
FIG. 4 illustrates unsupervised training of an anomaly detector based on data instances of synthetic data according to some embodiments.

The training data instances may be preprocessed as is known in the art prior to training the first system at S240. Such preprocessing may include but is not limited to filling empty values, normalizing data, and feature engineering (e.g., the creation of more input values using diff, std, sum, z-score, operators). FIG. 4 illustrates input of training data instances 1250 to anomaly detection system 1235 in some embodiments of S240. As noted above, system 1235 may comprise, for example, a Kernel Density Estimation algorithm, a Nearest Neighbors algorithm, an Isolation Forest algorithm, a Local Outlier Factor algorithm or a Local Outlier Probability algorithm.

Training of anomaly detection system 1235 may include input of training data instances 1250, acquisition of resulting output (i.e., anomaly scores) by component 420, modification of system 1235 by component 420 based on the output, and determination to terminate training upon satisfaction of a given target (e.g., an accuracy level, an elapsed time period, a number of iterations). The thusly-trained system 1235 may receive a data instance consisting of the values of the current metrics at different time points and output a score predicting a degree to which the data instance represents an anomaly.

A second system is trained at S250 using supervised learning to classify incident types based on the output of the first system. As is known in the art, each training data instance used in supervised learning should be labeled with a ground truth value. FIG. 3 also shows labels 1252 associated with each training data instance 1250. Labels 1252 indicate an incident type associated with each training data instance 1250. Since the incident types and times of occurrence of the incidents included in synthetic time-series data 1220 are known, the training data instances 1250 associated with these incidents may be identified and labeled accordingly. Labels 1252 associated with most training data instances 1250 will indicate no incident type (e.g., NULL). However, certain time periods will be associated with particular incident types based on the incidents included during generation of synthetic time-series data 1220.

Figure 5:
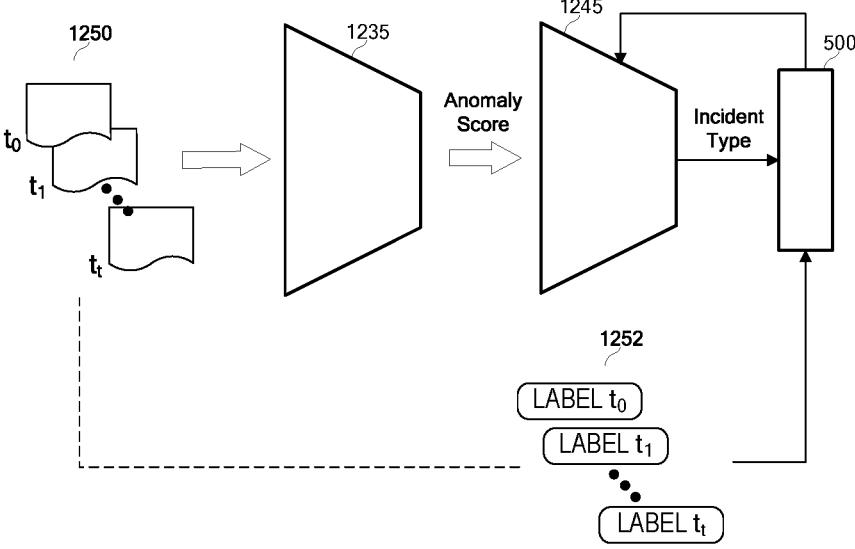
FIG. 5 illustrates supervised training of an incident classifier based on labeled data instances of synthetic data according to some embodiments.

FIG. 5 shows training data instances 1250 and associated labels 1252 during S250 according to some embodiments. System 1235 of FIG. 5 has been trained at S240 and incident classification system 1245 may comprise any multi-classification trainable network or algorithm that is or becomes known.

During training, training data instances 1250 are input to system 1235 and the resulting anomaly scores are input to classification system 1245. Classification system 1245 outputs an incident type for each anomaly score and loss layer 500 compares the incident types to the associated ground truth labels 1252 to determine a total loss. The loss is back-propagated to system 1245 which is modified based thereon. Training continues in this manner until satisfaction of a given performance target or a timeout situation. In some embodiments, classification system 1245 is a decision tree and is trained at S250 using the XGBoost library.

FIG. 6 is a flow diagram of process 600 to label selected data instances during deployment of a trained unsupervised learning system and a trained supervised learning system according to some embodiments.

At S610, the trained first system and the trained second system are deployed to receive actual time-series data of each of the metrics. For example, trained systems 1235 and 1245 may be enabled in incident classification system 120 to process metric-related data received from monitoring system 110. Monitoring system 110 may receive time-series data related to many metrics from landscape 100 and provide time-series data of a subset of those metrics (i.e., those metrics which are associated with incident types) to system 120. In other embodiments, incident classification system 120 filters the data of metrics associated with incident types from the data received from monitoring system 110.

Figure 7:
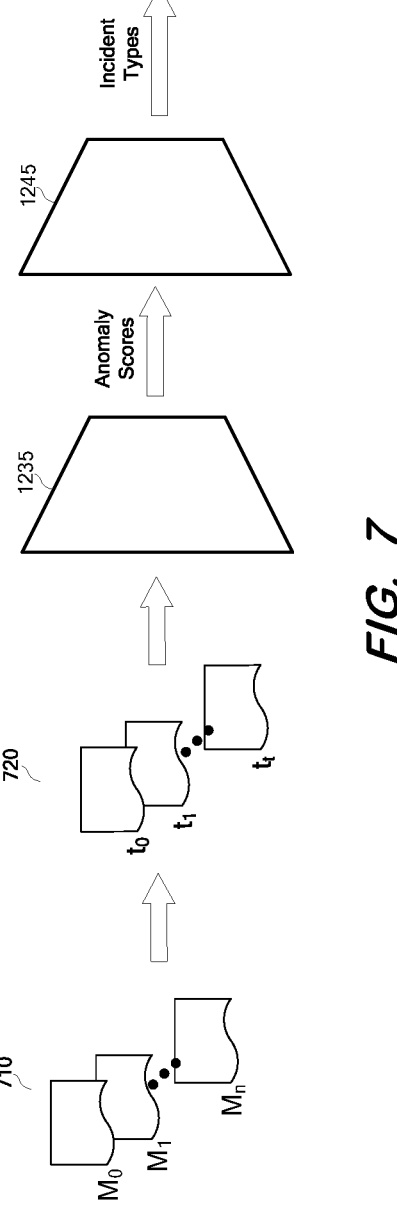
FIG. 7 illustrates deployment of a trained unsupervised learning system and a trained supervised learning system according to some embodiments.

At S620, the trained first system determines anomaly scores based on the received. As mentioned above, time period-specific data instances are generated from the time-series data, and those data instances are input to the trained first system at S620. FIG. 7 shows time-series data 710 received from a productive system such as landscape 100 according to some embodiments. Time-series data 710 is associated with multiple metrics $M_0$-$M_n$, which will be assumed to be the same metrics determined at S220 of process 200. Data instances 720 are generated from time-series data 710, where each data instance 720 includes a value of each metric $M_0$-$M_n$ at a same time point.

Data instances 720 are input to trained system 1235 to generate an anomaly score corresponding to each data instance 720 (and to the time period of each data instance 720). The anomaly scores are input to trained system 1245 at S630 to determine an incident type based on each anomaly score. According to some embodiments, and to conserve resources, only those anomaly scores above a certain threshold are input to system 1245 at S630. The incident type determined for an anomaly score is associated with the data instance 720 (and its time period) which generated the anomaly score.

Any determined incident types (i.e., other than NULL) may be reported to appropriate users, such as, for example, a devops team. After a period of determining incident types based on real monitoring data (e.g., one week, one month, per operator availability), S640 executes to select certain data instances which were input to system 1235 based on their corresponding anomaly scores and/or the incident types.

Figure 8:
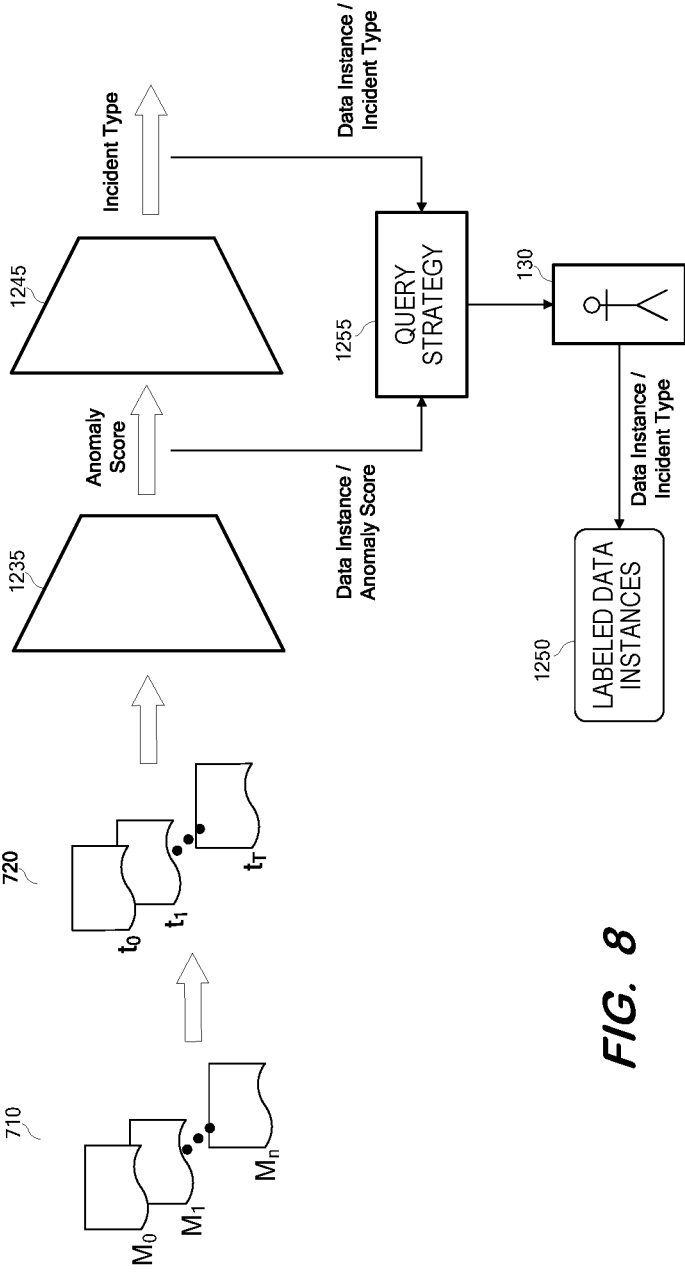
FIG. 8 illustrates selection and labeling of data instances during deployment of a trained unsupervised learning system and a trained supervised learning system according to some embodiments.

The selection at S640 is intended to identify informative and representative data instances for review and possible re-labeling by a domain expert. FIG. 8 illustrates the elements of FIG. 7, along with query strategy component 1255 which may operate to select the data instances at S640. Query strategy component 1255 selects data instances 720 input to system 1235 based on their resulting anomaly scores and selects data instances 720 based on their resulting incident types output by system 1245. In some embodiments, query strategy component 1255 may select a data instance 720 based on its resulting anomaly score and incident type.

Query strategy component 1255 may follow any algorithm that is or becomes known. In some embodiments, query strategy component 1255 attempts to select $x_{i=1, \ldots, b} \in u$ in order to maximize $$\sum_{i=1}^{b} f(x_i),$$

given a set of unlabeled points u, a given budget b (e.g., domain experts are allotted 1 hour to label 100 cases, resulting in a budget of 100), and an interest function $f: u \rightarrow \mathbb{R}$ which is a measure of the informative value of labeling point u, where each point $x \in u$. Such a general query algorithm can be characterized as:

```
Input: u (unlabeled dataset), b (budget), f (interest function)
Set A ← Ø
while |A| < b do
    Let x ← argmax_{x∈u\A} f (x)
    Set A ← A U {x}
end while
return A
```

According to some embodiments, query strategy component 1255 simply selects random ones of data instances 720 at S640. S640 may additionally or alternatively include selection of all data instances 720 for which a non-NULL incident type was determined by system 1245. In another example, query strategy component 1255 may select data instances 720 which resulted in the maximum anomaly scores. These data instances 720 do not necessarily correspond to non-NULL incident types.

Considering that certain incidents are associated with a set of metrics, query strategy component 1255 may select the data instances 720 that have the maximum (or minimum) average of anomaly scores of the metrics associated with the incident type which system 1240 determined for the data instance. This strategy assumes that system 1235 outputs an anomaly score for each metric of data instances 720.

The budget is an amount of operator effort that is available to perform labeling. For example, the budget can be eight hours every three weeks. Some embodiments apportion the budget via a predetermined ratio into a first budget for reviewing data instances that have been classified as non-NULL incident types, and a second budget for reviewing data instances classified as NULL incident types but having the highest average anomaly score.

The selected data instances are presented to an operator at S650. For example, operator 130 may log in to a user interface provided by incident classification system 120 to review and label the selected data instances. At S660, an incident type for each presented data instance is received from the operator. The incident type may be the same as the incident type determined for the data instance by system 1245. In some cases, system 1245 determines a NULL incident type for a data instance which is changed by operator 130 to a non-NULL incident type. Similarly, system 1245 may determine a non-NULL incident type for a data instance which is changed by operator 130 to a NULL incident type. The operator-labeled data instances may be stored in labeled data instances 150, along with or separate from the labeled synthetic data instances.

Incident classifier 1245 is retrained at S670 based on at least on the selected data instances and their operator-confirmed incident types. Advantageously, the creation of an operator-labeled training dataset and retraining of the incident classifier may proceed while the originally-trained incident classifier continues to classify data instances at S630. Once incident classifier 1245 is retrained, flow may return to S610 to deploy the newly-trained classifier and begin classification of newly-received data instances at S620 and S630. Process 600 then continues as described above such that the operator-labeled dataset grows over time and is used to periodically re-train the incident classifier and thereby iteratively improve its performance.

Figure 9:
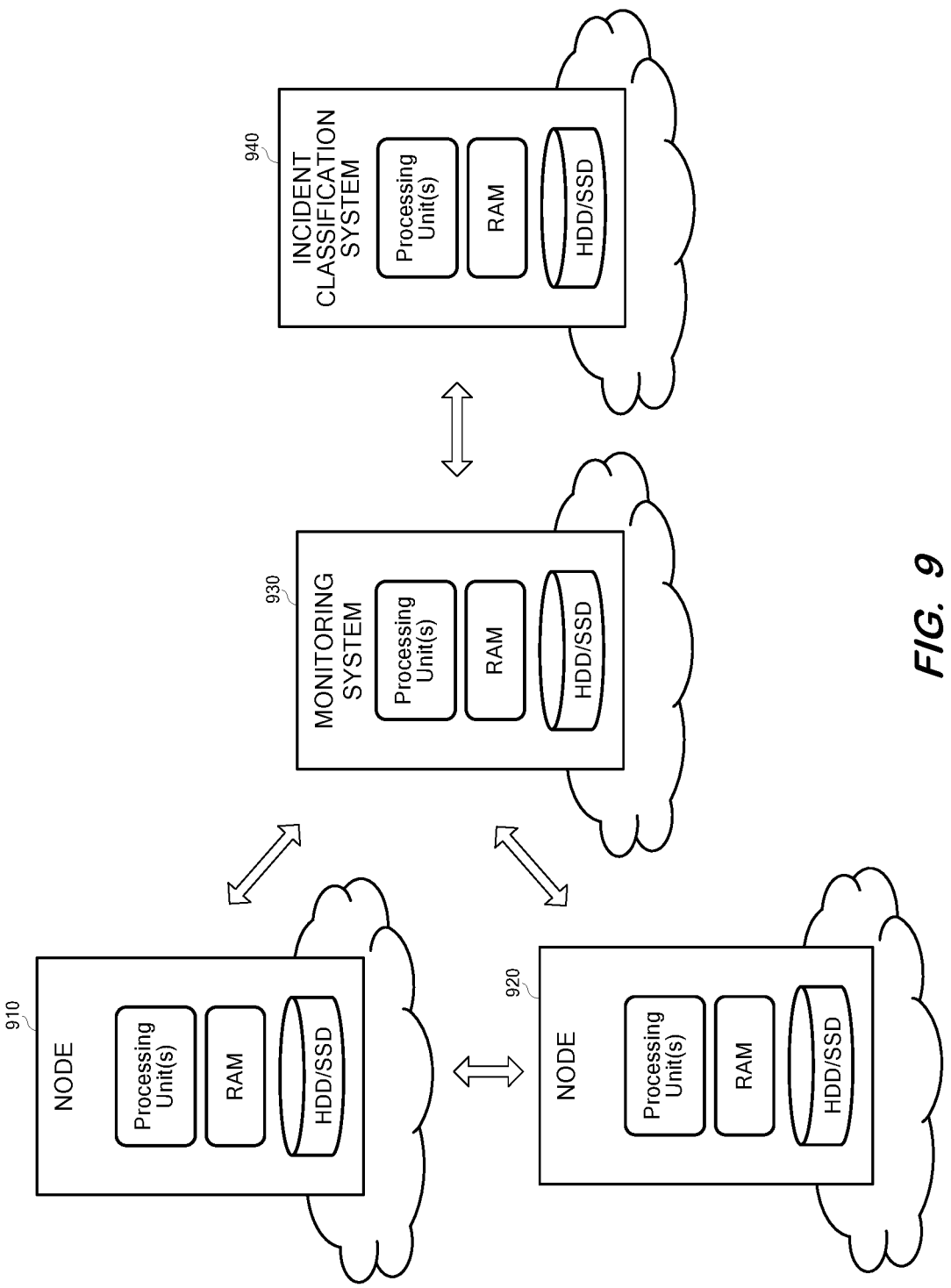
FIG. 9 is a block diagram of cloud-based servers of a system landscape providing incident classification according to some embodiments.

FIG. 9 illustrates a cloud-based database deployment according to some embodiments. The illustrated components may comprise cloud-based compute resources residing in one or more public clouds providing self-service and immediate provisioning, autoscaling, security, compliance and identity management features.

Nodes 910 and 920 may comprise servers or virtual machines of a Kubernetes cluster. Nodes 910 and 920 may support containerized applications which provide one or more services to users. In this regard, nodes 910 and 920 may comprise an implementation of landscape 100. Monitoring system 930 receives metric-related time-series data from each of nodes 910 and 920 as is known in the art. Incident classification system 940 receives this data (or a subset) thereof from monitoring system 930. Incident classification system 940 may operate as described herein to detect and classify incidents based on the received time-series data.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable program code; and
at least one processing unit to execute the processor-executable program code to cause the system to:
determine a plurality of metrics;
generate synthetic time-series data of each of the plurality of metrics;
determine a plurality of data instances, each of the plurality of data instances comprising a value of each generated synthetic time-series data for a first respective time period;
associate an event type label with each of the plurality of data instances;
train a first system based on the plurality of data instances to generate a score predicting a degree to which an input data instance represents an anomaly;
train a second system based on the plurality of data instances and their associated event type labels to classify scores generated by the first system;
receive actual time-series data of each of the plurality of metrics at the first system;
generate actual data instances from the actual time-series data, each actual data instance associated with a respective time period;
determine a score for each actual data instance using the trained first system;
determine an event types for each determined score using the trained second system;
select one or more of the actual data instances based on at least one of the determined scores and the determined event types;
present the selected data instances to an operator and, for each selected data instance, receive an operator-specified event type from the operator; and
re-train the second system based on the selected data instances and their operator-specified event types.

2. A system according to claim 1, wherein selection of one or more of the actual data instances comprises identification of maximum determined scores for which no event type was determined, and selection of data instances associated with the maximum determined scores.

3. A system according to claim 2, wherein selection of one or more of the actual data instances comprises identification of scores for which an event type was determined, and selection of data instances associated with the scores for which an event type was determined.

4. A system according to claim 3, wherein selection of the one or more of the actual data instances comprises selection of a predetermined ratio of data instances associated with scores for which no event type was determined to data instances associated with scores for which an event type was determined.

5. A system according to claim 3, wherein a score for each actual data instance is determined based on a score for each metric of the actual data instance, and wherein selection of the one or more of the actual data instances comprises selection of actual data instances associated with a non-NULL event type and having a highest average score for the metrics associated with its non-NULL event type.

6. A system according to claim 1, wherein a score for each actual data instance is determined based on a score for each metric of the actual data instance, and wherein selection of the one or more of the actual data instances comprises selection of actual data instances associated with a non-NULL event type and having a highest average score for the metrics associated with its non-NULL event type.

7. A system according to claim 1, wherein a score for each actual data instance is determined based on a score for each metric of the actual data instance, and wherein selection of the one or more of the actual data instances comprises selection of actual data instances associated with a non-NULL event type and having a lowest average score for the metrics associated with its non-NULL event type.

8. A computer-implemented method comprising:
generating synthetic time-series data of each of a plurality of metrics;
determining a plurality of data instances, each of the plurality of data instances comprising a value of each generated synthetic time-series data for a first respective time period;
associating an event type label with each of the plurality of data instances;
training a first system based on the plurality of data instances to generate a score predicting a degree to which an input data instance represents an anomaly;
training a second system based on the plurality of data instances and their associated event type labels to classify scores generated by the first system into event types;
receiving actual time-series data of each of the plurality of metrics at the first system;
generating actual data instances from the actual time-series data, each actual data instance associated with a respective time period;
determining a score for each actual data instance using the trained first system;
determining an event types for each determined score using the trained second system;
selecting one or more of the actual data instances based on at least one of the determined scores and the determined event types;
presenting the selected data instances to an operator and, for each selected data instance, receiving an operator-specified event type from the operator; and
re-training the second system based on the selected data instances and their operator-specified event types.

9. A method according to claim 8, wherein selecting one or more of the actual data instances comprises identification of maximum determined scores for which no event type was determined, and selecting actual data instances associated with the maximum determined scores.

10. A method according to claim 9, wherein selecting one or more of the actual data instances comprises identifying scores for which an event type was determined, and selecting actual data instances associated with the scores for which an event type was determined.

11. A method according to claim 10, wherein selecting the one or more of the actual data instances comprises selecting a predetermined ratio of actual data instances associated with scores for which no event type was determined to actual data instances associated with scores for which an event type was determined.

12. A method according to claim 10, wherein a score for each actual data instance is determined based on a score for each metric of the actual data instance, and wherein selecting the one or more of the actual data instances comprises selecting actual data instances associated with a non-NULL event type and having a highest average score for the metrics associated with its non-NULL event type.

13. A method according to claim 8, wherein a score for each actual data instance is determined based on a score for each metric of the actual data instance, and wherein selecting the one or more of the actual data instances comprises selecting actual data instances associated with a non-NULL event type and having a highest average score for the metrics associated with its non-NULL event type.

14. A method according to claim 8, wherein a score for each actual data instance is determined based on a score for each metric of the actual data instance, and wherein selecting the one or more of the actual data instances comprises selecting actual data instances associated with a non-NULL event type and having a lowest average score for the metrics associated with its non-NULL event type.

15. A computer-readable medium storing processor-executable program code, the program code executable by a computing system to:
determine a plurality of metrics;
generate synthetic time-series data of each of the plurality of metrics;
determine a plurality of data instances, each of the plurality of data instances comprising a value of each generated synthetic time-series data for a first respective time period;
associate an event type label with each of the plurality of data instances;
train a first system based on the plurality of data instances to generate a score predicting a degree to which an input data instance represents an anomaly;
train a second system based on the plurality of data instances and their associated event type labels to classify scores generated by the first system into event types;
receive actual time-series data of each of the plurality of metrics at the first system;
generate actual data instances from the actual time-series data, each actual data instance associated with a respective time period;
determine a score for each actual data instance using the trained first system;
determine an event types for each determined score using the trained second system;
select one or more of the actual data instances based on at least one of the determined scores and the determined event types;
present the selected data instances to an operator and, for each selected data instance, receive an operator-specified event type from the operator; and
re-train the second system based on the selected data instances and their operator-specified event types.

16. A medium according to claim 15, wherein selection of one or more of the actual data instances comprises identification of maximum determined scores for which no event type was determined, and selection of actual data instances associated with the maximum determined scores.

17. A medium according to claim 16, wherein selection of one or more of the actual data instances comprises identification of scores for which an event type was determined, and selection of actual data instances associated with the scores for which an event type was determined.

18. A medium according to claim 17, wherein selection of the one or more of the actual data instances comprises selection of a predetermined ratio of actual data instances associated with scores for which no event type was determined to actual data instances associated with scores for which an event type was determined.

19. A medium according to claim 17, wherein a score for each actual data instance is determined based on a score for each metric of the actual data instance, and wherein selection of the one or more of the actual data instances comprises selection of actual data instances associated with a non-NULL event type and having a highest average score for the metrics associated with its non-NULL event type.

20. A medium according to claim 15, wherein a score for each actual data instance is determined based on a score for each metric of the actual data instance, and wherein selection of the one or more of the actual data instances comprises selection of actual data instances associated with a non-NULL event type and having a lowest average score for the metrics associated with its non-NULL event type.

* * * * *